Nov. 4, 1952

L. F. WOUTERS 2,617,042

COINCIDENCE CIRCUIT

Filed April 5, 1951

INVENTOR.
LOUIS F. WOUTERS

BY Roland A. Anderson

ATTORNEY.

Patented Nov. 4, 1952

2,617,042

UNITED STATES PATENT OFFICE 2,617,042

COINCIDENCE CIRCUIT

Louis F. Wouters, Oakland, Calif., assignor to the United States of America as represented by the United States Atomic Energy Commission Application April 5, 1951, Serial No. 219,446

3 Claims. (Cl. 250—83.3)

This invention relates to a coincidence circuit and more particularly to a circuit for determining coincidences in two spaced-apart scintillation indicators.

In coincidence counting the results obtained from present circuits are subject to errors caused by random particles striking the second indicator to give a spurious count. Complex circuits, such as that outlined on page 244 (Fig. 4.18), Electronics, by Elmore and Sands, National Nuclear Energy Series, Division V, volume 1, could be used for coincidence counting without errors as stated above; however, such circuits are inherently complicated and difficult to maintain.

It will be readily apparent that a coincidence circuit, arranged to count only pulses of equal height and within a predetermined time interval, will decrease the possibility of random or spurious counts considerably. By placing two scintillation indicators in spaced-apart relation along the path of a beam of charged particles, a count of such particles successively entering both crystals may be made accurately while eliminating the effects of chance particles to a greater degree than heretofore thought possible. The scintillations of each crystal are focused upon the light-sensitive cathode of separate photomultiplier tubes, thereby forming two signal channels. The channel related to the first indicator is suitably coupled to vertical deflecting plates of a cathode ray tube while the channel related to the second indicator is coupled to the horizontal deflecting plates of such cathode ray tube. The coupling means connecting the photomultiplier tubes to the cathode ray tubes may be easily designed to incorporate desired delay time to the pulses so that the pulses are substantially in phase at the cathode ray tube. Under such conditions it will be readily apparent that a straight line trace having a forty-five degree angle with respect to the deflecting plates will be formed only when the two pulses are substantially in phase and have substantially the same maximum value. To utilize such principle a mask having a narrow slit lying along the forty-five degree line, as measured from the plane of the horizontal deflecting plates, is placed over the screen of the cathode ray tube to permit the projection of a beam of light only under the condition of a forty-five degree trace on the screen. A phototube placed to receive such beam of light then transmits a signal through an amplifier to trip a counter.

It is therefore an object of the present invention to provide a new and improved coincidence counter.

Another object of the invention is to provide a simplified circuit for coincidence counting.

Still another object of the invention is to provide a coincidence circuit for counting coincidences only when the pulses are substantially equal in magnitude and phase.

A further object of the invention is to provide a coincidence circuit comprising a pair of photomultiplier tubes for impressing signals upon the deflecting plates of a cathode ray tube and means for indicating only the occurrence of pulses of equal phase and magnitude.

A still further object of the invention is to provide a sensitive coincidence circuit having a short resolving time.

Further objects and advantages will be apparent from the following description and claims considered together with the accompanying drawing in which:

Figure 1:
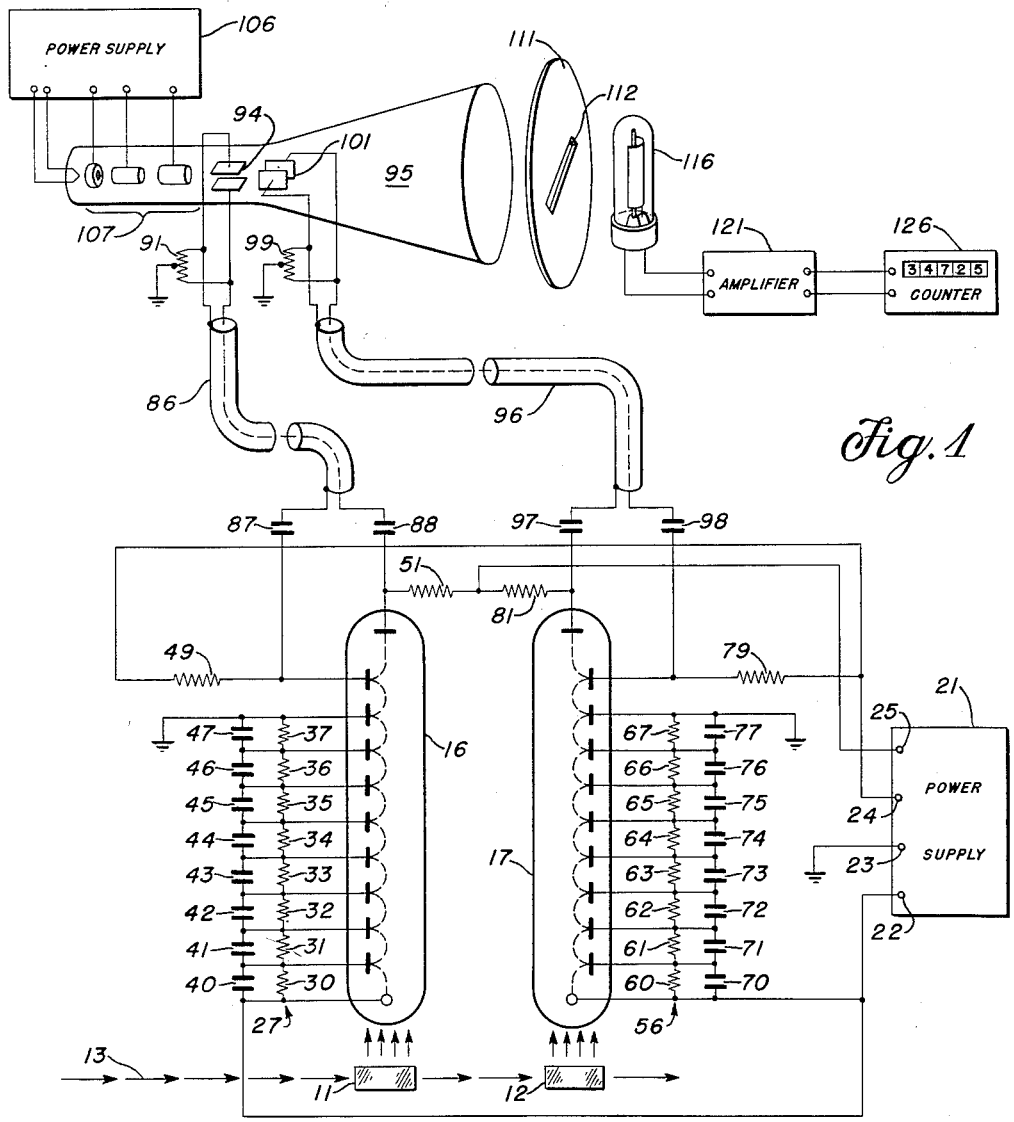
Figure 1 is a schematic wiring diagram of the present invention.

Considering the drawing in detail, and Fig. 1 in particular, there is provided a pair of scintillation indicators 11 and 12 disposed in spaced-apart relation in the path of a beam of charged particles 13. When the particles of the beam 13 enter the indicators 11 and 12 the material thereof fluoresces and to utilize such phenomenon a photomultiplier tube 16 is disposed adjacent one indicator 11 while a second similar photomultiplier tube 17 is disposed adjacent the other indicator 12. The relation of the photomultiplier tubes 16 and 17 with the indicators 11 and 12 is such that light of the fluorescing material strikes the light-sensitive cathode of the tubes.

To furnish the required potentials to the photomultiplier tubes 16 and 17 there is provided a conventional unidirectional power supply 21 having a negative terminal 22, a grounded terminal 23, a positive terminal 24, and a more positive terminal 25. A first resistance voltage divider 27 comprising a plurality of series-connected resistors 30 to 37 is connected between the negative terminal 22 of the power supply 21 and ground. To by-pass any radiofrequency voltages appearing across the resistors 30 to 37 one of a plurality of capacitors 40—47 is respectively connected across each of such resistors. The cathode of the first photomultiplier tube 16 is connected to the negative terminal 22 of the power supply 21 and each of the dynodes, except the final one, of the tube is respectively connected to a junction between the resistors 30—37 so that suitable operating potentials exist thereat. The final dynode of the tube 16 is connected to the positive terminal 24 of the power supply 21 through a dropping resistor 49 and the anode is connected to the more positive terminal 25 through a dropping resistor 51.

A second resistance voltage divider 56 comprising a plurality of series-connected resistors 60 to 67 is also connected between the negative terminal 22 of the power supply 21 and ground. One of a plurality of by-pass capacitors 70 to 77 is respectively connected across each of the resistors 60 to 67. The cathode of the photomultiplier tube 17 is connected to the negative terminal 22 and each of the dynodes, except the final one, is respectively connected to a junction between the resistors 60 to 67. The final dynode of the photomultiplier tube 17 is connected to the positive terminal 24 through a dropping resistor 79 and the anode is connected to the more positive terminal 25 through a dropping resistor 81 to complete the operational connections of the tube.

The final dynode of the photomultiplier tube 16 is connected to one conductor of a section of coaxial cable 86 through a blocking capacitor 87 and the anode of the tube is connected to the other conductor of the cable 86 through a blocking capacitor 88. The other ends of the conductors of the cable 86 are connected respectively to either side of a resistor 91 having a grounded center tap and further to the vertical deflecting plates 94 of a conventional cathode ray tube 95.

The final dynode of the other photomultiplier tube 17 and the anode thereof are respectively connected to the two conductors of a coaxial cable 96 through blocking capacitors 97 and 98. The other ends of the conductors of the cable 96 are connected to either side of a resistor 99 having a grounded center tap and further to the horizontal deflecting plates 101 of the cathode ray tube 95.

A conventional power supply 106 is provided to impress suitable potentials upon the electron gun 107 of the cathode ray tube 95. In this manner it is readily apparent that the electron beam of the cathode ray tube 95 will be centered on the screen thereof when no potentials are applied to either of the sets of deflecting plates 94 and 101. It will also be apparent that vertical and horizontal deflecting voltages may be obtained from the power supply 106 and suitably impressed on the deflecting plates 94 and 101 so that the beam may be adjustably positioned at any desired point of origin on the screen.

With the foregoing connections accomplished in the manner described and with the power supplies 21 and 106 energized the circuit is operable. When a charged particle causes the material of the first indicator 11 to fluoresce the light scintillations strike the light-sensitive cathode of the tube 16 thereby freeing electrons which are then accelerated from one dynode to another in increasing quantities. The flow of electrons from the final dynode to the anode of the tube 16 is translated into a voltage by the resistors 49 and 51 which is carried by the coaxial cable 86 to the resistor 91. Since the resistor 91 has a grounded center tap the voltage developed is applied in push-pull to the vertical deflecting plates 94 of the cathode ray tube 95. Such a voltage difference between the vertical deflecting plates 94 causes the electron beam of the cathode ray tube 95 to be deflected vertically from the point of origin.

Figure 2:
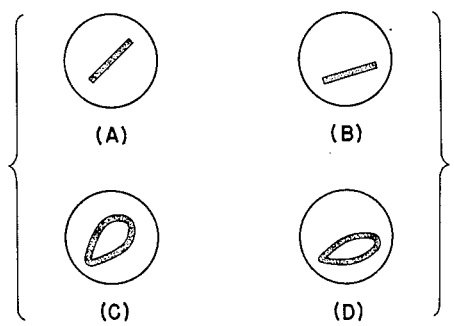
Figure 2 is a series of traces on the screen of a cathode ray tube under varying conditions possible with the arrangement of Fig. 1.

It will be readily apparent that the same action, as outlined above, takes place between the second indicator 12 and the horizontal deflecting plates 101, when a charged particle causes fluorescence in the indicator, to cause the electron beam to be deflected horizontally from the point of origin. From the foregoing it will be understood that, when both pulses arrive at the respective deflecting plates at the same time and are equal in magnitude, a trace will be scribed across the screen of the cathode ray tube at a forty-five degree angle and such condition is illustrated in Fig. 2A. If, however, the vertical deflecting pulse is less than the horizontal and both pulses arrive at the same time, the angle of the trace will be less than forty-five degrees as shown in Fig. 2B. Next consider the case where the pulse height is the same but the time of arrival of the pulses is different and it will be apparent that the trace will be open and vary about a forty-five degree line which is illustrated in Fig. 2C. Where both the time and magnitude are different an open trace, similar to the last described, will appear, as shown in Fig. 2D, varying about a line on a different angle.

In order to assure that the pulses from the two indicators reach the respective deflecting plates 94 and 101 of the cathode ray tube 95, when the indicators 11 and 12 are energized by the same beam 13 of charged particles, it is necessary to lengthen the coaxial cable 86 with respect to the length of the other cable 96. Such differential in length of the two cables 86 and 96 should be by a length having a time delay constant substantially equal to the time required by the particles of the beam 13 to traverse the distance between the indicators 11 and 12. It may also be found necessary to lengthen the same cable 86 to adjust for the time necessary for the electron beam to travel from one set of deflecting plates 94 to the other set of plates 101.

To utilize the cathode ray tube 95 and the associated circuits as a device for discriminating against pulses which are not equal or not in phase at the deflecting plates 94 and 101, a mask 111 is provided to shield or cover the screen of the tube except along the forty-five degree line. Thus the mask 111 is disposed to cover the screen of the cathode ray tube 95 and has an elongated aperture 112 along the line of a trace swept by the electron beam of the tube when the deflecting voltages are equal in magnitude and occur simultaneously.

A photoelectric tube 116, of the diode or multiplier type, is disposed adjacent to the aperture 112 of the mask 111 so that fluorescence of the screen of the cathode ray tube 95 within the area of the aperture falls upon the light-sensitive cathode. The output of the tube 116 is connected to the input of a conventional amplifier 121 and the output thereof is connected to a conventional counter 126 of the electromagnetic or similar type. Thus each time the deflecting plates 94 and 101 of the tube 95 have voltages of equal magnitude occurring at substantially the same time, the counter 126 is energized to indicate a coincidence.

It has been found that the resolving time of the circuit is a function of the persistence of the screen of the cathode ray tube 95 and of the sensitivity of the photoelectric tube 116 disposed adjacent thereto. By increasing the sensitivity of the photoelectric tube 116 the factor involving the persistence of the screen of the tube 95 is greatly diminished. In operating the circuit with a cathode ray tube having a screen persistence of about 60 microseconds, it has been found that such a long persistence does not limit the resolving time by any appreciable amount where a photomultiplier tube capable of judging the difference between a fluorescence which has lasted for $2 \times 10^{-10}$ sec. and one that has freshly appeared.

From the foregoing it will be apparent that the uses of the circuit are numerous and that, by proper placement of the mask 111 and aperture 112 with respect to the screen of the cathode ray tube 95, discrimination may be had between input pulses having any selected relation as to magnitude and phase.

While the salient features of the present invention have been described in detail with respect to one embodiment it will, of course, be apparent that numerous modifications may be made within the spirit and scope of the invention and it is therefore not desired to limit the invention to the exact details shown except insofar as they may be defined in the following claims.

What is claimed is:

1. In a coincidence circuit, the combination comprising a first and second scintillation indicator disposed in spaced-apart relation along the path of a beam of charged particles, a first and second light responsive means respectively disposed adjacent each of said indicators for transforming light scintillations into electrical pulses, a cathode ray tube having an electron gun, a pair of vertical deflecting plates, a pair of horizontal deflecting plates, and a screen, first coupling means connected to said first light responsive means and said vertical deflecting plates, second coupling means connected to said second light responsive means and said horizontal deflecting plates, said first coupling means including a time delay element having a time constant equal to the transit time of particles between said indicators, a mask disposed across said screen and having a single elongated aperture therein disposed at a forty-five degree angle with respect to the axis of said cathode ray tube, and means disposed adjacent said aperture for recording a count each time said deflecting plates are equally energized at the same time.

2. In a coincidence circuit, the combination comprising a first and second scintillation indicator disposed in spaced-apart relation along the path of a beam of charged particles, a first and second light responsive means respectively disposed adjacent each of said indicators, a cathode ray tube having an electron gun, a pair of vertical deflecting plates, a pair of horizontal deflecting plates, and a screen, a first section of transmission line connected between said first light responsive means and said vertical deflecting plates, a second section of transmission line connected between said second light responsive means and said horizontal deflecting plates, said second section of transmission line having a time constant greater than that of said first section of transmission line by the transit time of particles between said indicators, a mask disposed across said screen and having a single elongated aperture therein disposed at a forty-five degree angle with respect to the axis of said cathode ray tube, a phototube disposed adjacent said aperture to receive light therefrom when said deflection plates are equally energized at the same time, and means connected to said phototube for recording the number of actuations thereof.

3. In a coincidence circuit, the combination comprising a first and second scintillation indicator disposed in spaced-apart relation along the path of a beam of charged particles, a first and second photomultiplier tube respectively disposed adjacent each of said indicators, a cathode ray tube having an electron gun, a pair of vertical deflecting plates, a pair of horizontal deflecting plates, and a screen, a first length of coaxial cable coupled at one end to the output of said first photomultiplier tube and at the other end to said vertical deflecting plates, a second length of coaxial cable coupled at one end to the output of said second photomultiplier tube and at the other end to said horizontal deflecting plates, said first cable being longer than said second cable by a length sufficient to delay voltages by a time equal to the transit time of particles between said indicators, a mask disposed across said creen and having an aperture therein, said aperture being an elongated slot lying along a forty-five degree line with respect to the axis of said cathode ray tube, a third photoelectric tube disposed adjacent said aperture to receive light therefrom when scintillations of said indicators are equal and occur within said transit time, an amplifier connected to said third photomultiplier tube, and an electromechanical counter connected to the output of said amplifier.

LOUIS F. WOUTERS.

REFERENCES CITED

The following references are of record in the file of this patent:

UNITED STATES PATENTS

| Number | Name | Date |
| --- | --- | --- |
| 1,977,999 | Prinz | Oct. 23, 1934 |
| 2,144,337 | Koch | Jan. 17, 1939 |
| 2,517,404 | Morton | Aug. 1, 1950 |
| 2,527,512 | Arditi | Oct. 31, 1950 |
| 2,540,016 | Sunstein | Jan. 30, 1951 |
| 2,550,106 | Coltman et al. | Apr. 24, 1951 |